Nov. 7, 1939.     D. C. DRILL     2,178,871
PROCESS FOR PRODUCING FIBROUS MATERIAL
Original Filed Jan. 6, 1936     6 Sheets—Sheet 1

Daniel C. Drill
INVENTOR.

BY

ATTORNEY.

Nov. 7, 1939.  D. C. DRILL  2,178,871
PROCESS FOR PRODUCING FIBROUS MATERIAL
Original Filed Jan. 6, 1936  6 Sheets-Sheet 3

Daniel C. Drill
INVENTOR.
BY
ATTORNEY.

Nov. 7, 1939.   D. C. DRILL   2,178,871
PROCESS FOR PRODUCING FIBROUS MATERIAL
Original Filed Jan. 6, 1936   6 Sheets—Sheet 4

Daniel C. Drill
INVENTOR.

BY Carlton C. Davis
ATTORNEY.

Daniel C. Drill
INVENTOR.

ATTORNEY.

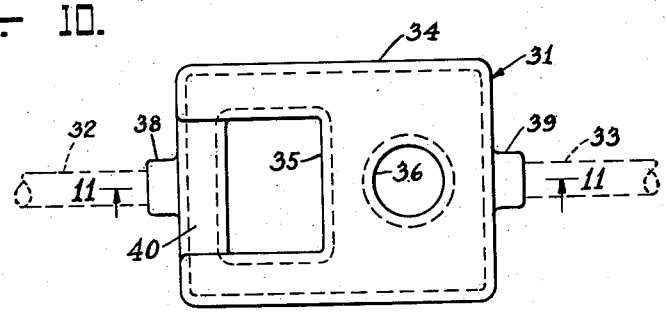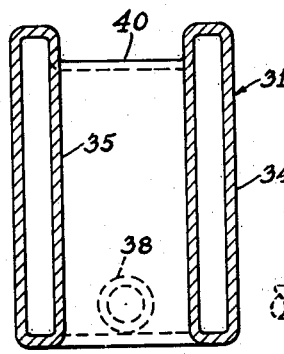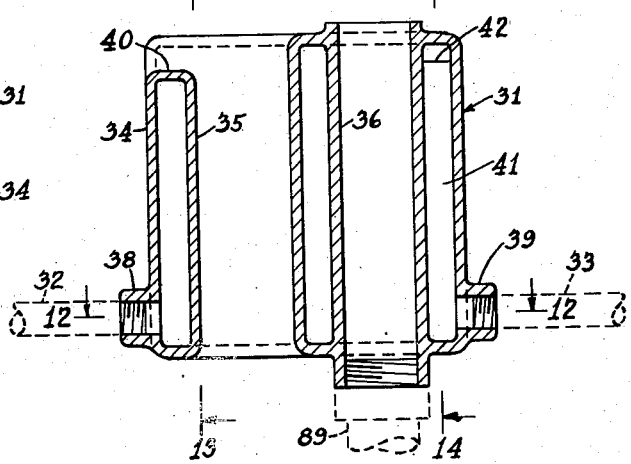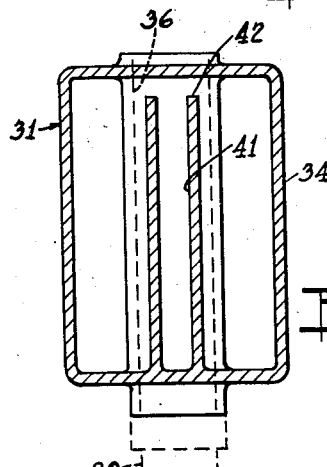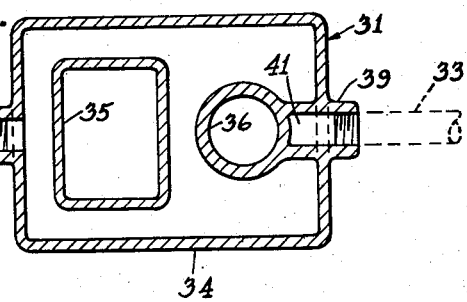

Patented Nov. 7, 1939

2,178,871

UNITED STATES PATENT OFFICE 2,178,871

PROCESS FOR PRODUCING FIBROUS MATERIAL

Daniel C. Drill, Wabash, Ind., assignor to American Rock Wool Corporation, Wabash, Ind., a corporation of Indiana Original application January 6, 1936, Serial No. 57,791. Divided and this application March 19, 1937, Serial No. 131,833

8 Claims. (Cl. 49—77.5)

My invention generally relates to a process whereby minerals may be melted. It also relates to a process for shredding shredable molten minerals into fibers such as, for instance, mineral wool or chemical asbestos.

In the productions of mineral fibers, such as, for instance, mineral wool, suitable raw materials in the form of lumps or rocks are now melted in metal cupolas, the lower sidewall portions of which are water-cooled. The materials, after being melted, flow out of an opening or spout provided in the cupola in the form of a small stream which falls upon a steam blast which shreds the stream into molten fibers. These fibers are blown by the blast into a blow chamber having a continuously movable base or conveyor upon which the blown fibers are deposited from suspension in the heated gases and vapors in the blow chamber. The deposited fibers form an elongated mat on the conveyor by which they are carried out of the blow chamber to be prepared for shipment and use. If felted blankets or batts are to be produced, a suitable binding material is co-mingled with the blast for the purpose of cementing the fibers together sufficiently to prevent them from separating when the blankets or batts are being handled or transported.

This conventional process has long been used by the industry, but it, unfortunately, has five serious and inherent defects which limit the expansion of the industry and the usefulness of its products.

One of the major defects of this old process is that much of the heat energy is lost through the metal and water-jacketed walls of the cupola. Many unsuccessful attempts have been made to provide a satisfactory refractory material which will not break down or melt or flux with the molten raw materials in the cupola. Numerous refractory materials, however, are capable of withstanding the action of the heated gaseous products of combustion at the approximately 3,000 degrees Fahrenheit temperature of the combustion chamber provided these refractory materials do not come into contact with the lava.

Unfortunately, in the type of cupola now used, lumps of fuel and raw mineral materials are mixed together and a portion of the molten materials trickle or run down the inside surface of the side walls of the cupola in such a manner that this surface is alternately exposed to direct contact with the molten lava and the heated products of combustion. No refractory material, insofar as is known to the applicant, is available which can withstand this continued alternate exposure.

It is one of the chief objects of my invention to provide a process and a means whereby this alternate exposure is prevented to the end that the refractory materials and heat insulating materials may be used to prevent excessive heat losses in the production of mineral wool and the like.

Another defect found in the present system is that the cupolas are limited to the use of high-priced fuel, usually a special grade of coke. It is another major object of my invention to provide a process and means whereby a cheaper form of fuel may be employed.

An additional defect of the present system is that much of the fuel is not thoroughly oxidized in the cupola, but passes out in the form of carbon monoxide. This is due to the fact that the cupola does not provide a suitable combustion area in which the fuel may be thoroughly mixed with the air and ignited before it comes into contact with the relatively cold raw materials. It is one of the objects of my invention to provide a process and means whereby the fuel may be more thoroughly consumed than it is in the cupolas now in use.

A further defect in the present system is that the raw material is limited to sizeable lumps, rocks or the like, due to the fact that finer particles are either blown out of the cupola by the blast of heated gases which pass through it or form a compact mass which prevents the free passage of gases through the cupola. It is a still further object of my invention to provide a process and a means whereby these finer particles may be utilized. The materials available for use in the form of rocks or lumps have been found only in limited areas and the cost of transportation to the average consumer forms a large part of the cost of the delivered finished product. My invention, therefore, renders it feasible to construct mineral wool plants in almost any part of the country, and thereby reduce the cost of the delivered product to the consumer.

Probably the most serious defect of the present system is that the mineral fibers are suddenly chilled by a blast of steam which is approximately 2,000 degrees Fahrenheit cooler than the molten lava. This sudden chilling obviously prevents the fibers from being properly annealed, renders them brittle, and causes the formation of an appreciable amount of "shot". This use of relatively cool steam is, in applicant's opinion, an obstacle to the technical development of the industry for the simple reason that it prevents the formation of ideal fibers which must be strong, silky and flexible.

This is a divisional application of an original and co-pending application for patent, Serial No. 57,791, filed January 6, 1936.

The full nature of my invention and its other objects and advantages will be understood by the accompanying drawings and the following descriptions and claims.

Figure 10 is a top plan view of a lava discharge and fuel input means associated with the device of my invention.

Figure 11 is a vertical section taken along the line 11—11 of Figure 10.

Figure 12 is a horizontal section taken along the line 12—12 of Figure 11.

Figure 1:
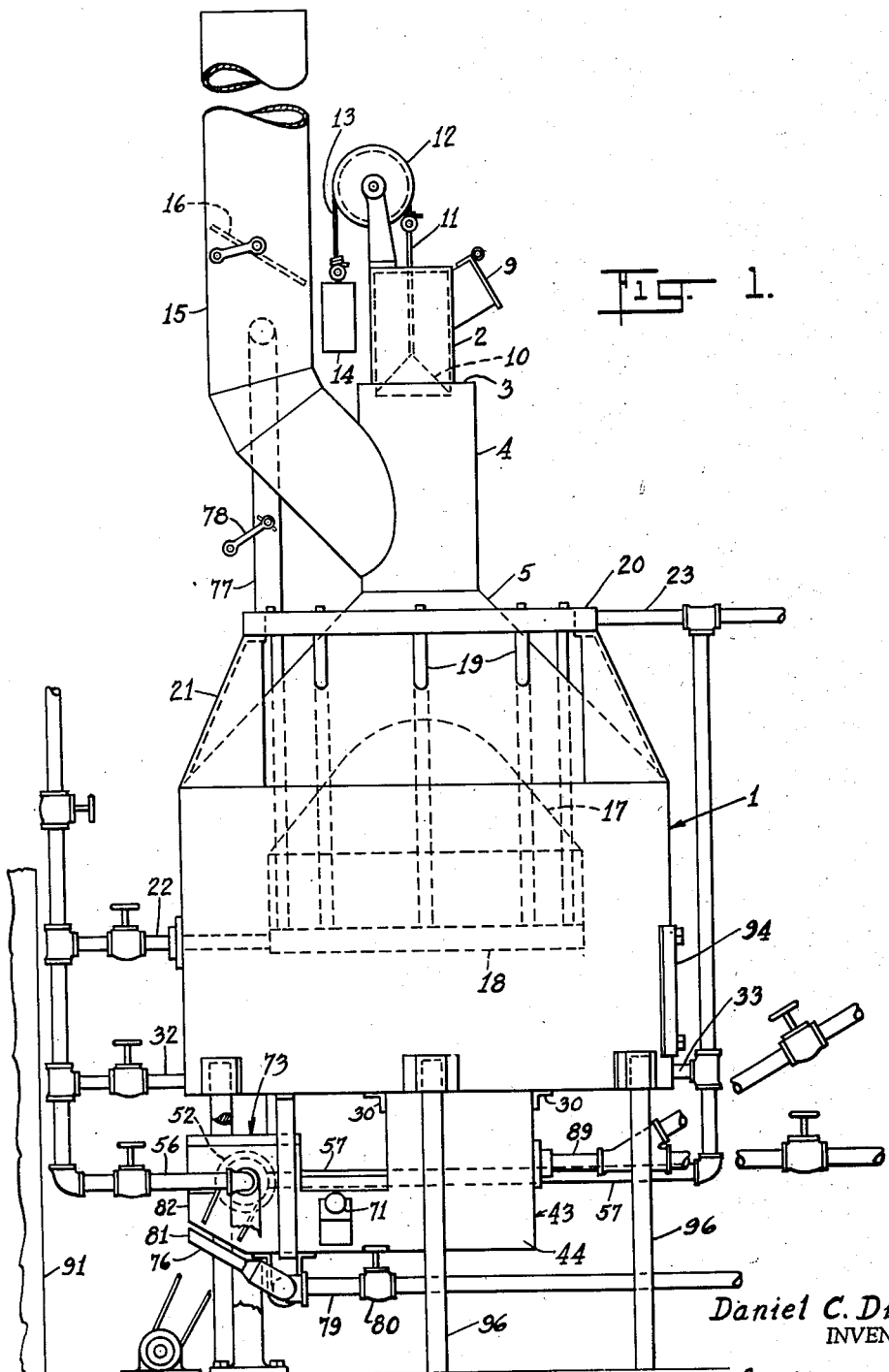
Figure 1 is an elevational view of the device of my invention.
Figure 2:
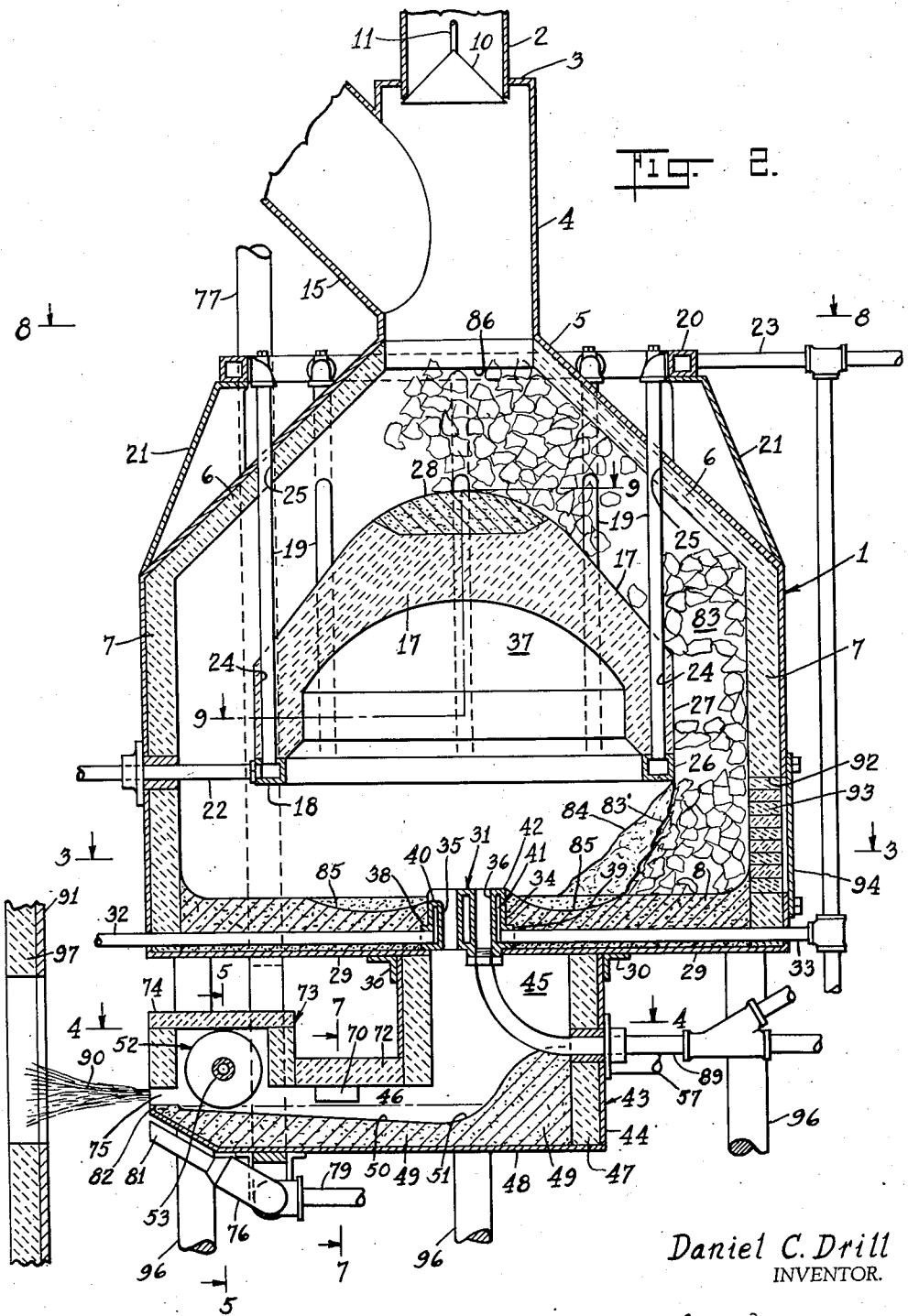
Figure 2 is a vertical sectional view of the same.
Figure 3:
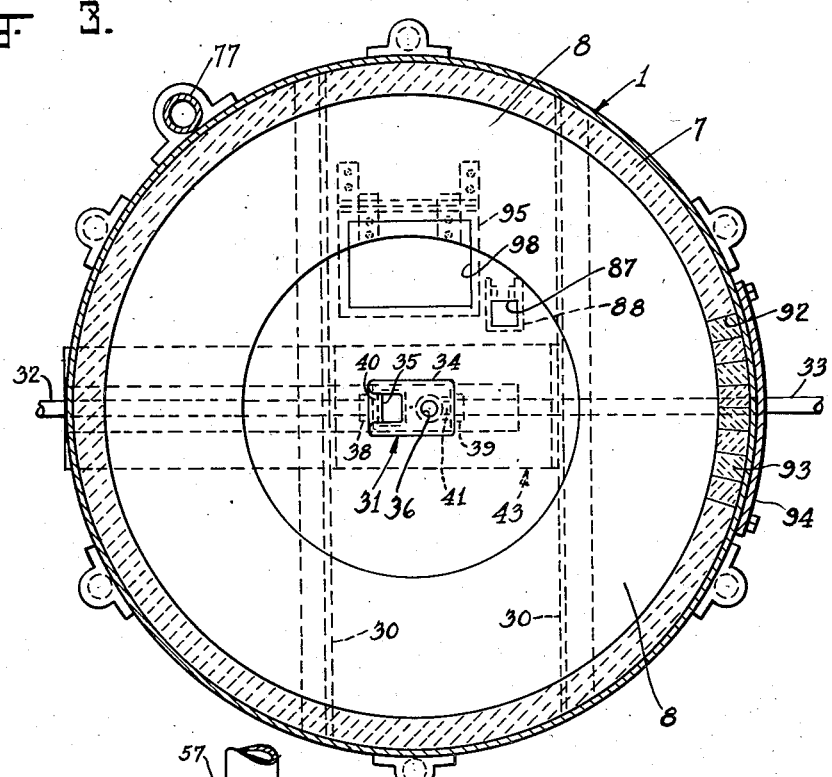
Figure 3 is a horizontal sectional view taken along the line 3—3 of Figure 2.
Figure 4:
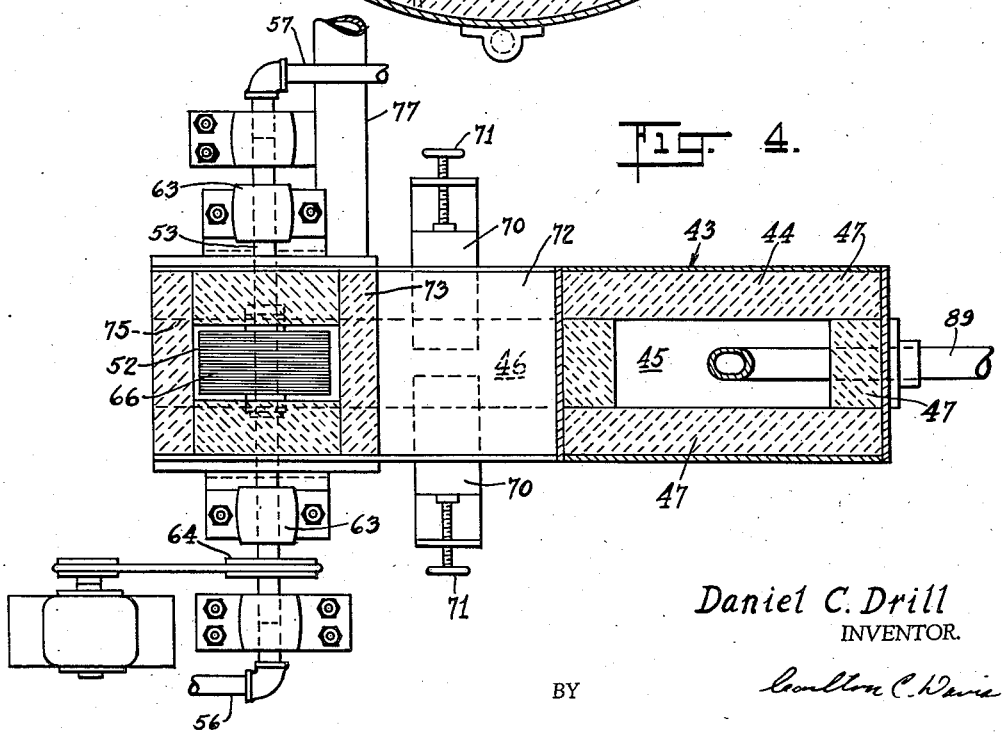
Figure 4 is a horizontal sectional view taken along the line 4—4 of Figure 2.
Figure 5:
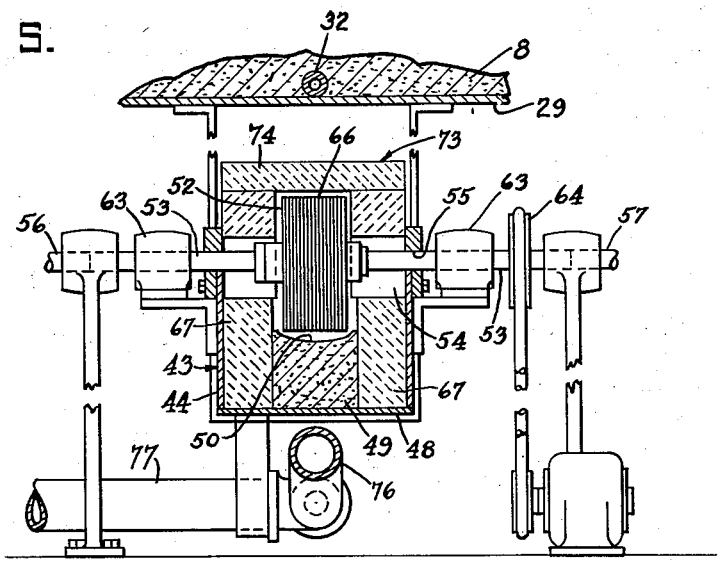
Figure 5 is a vertical section taken along the line 5—5 of Figure 2.
Figure 6:
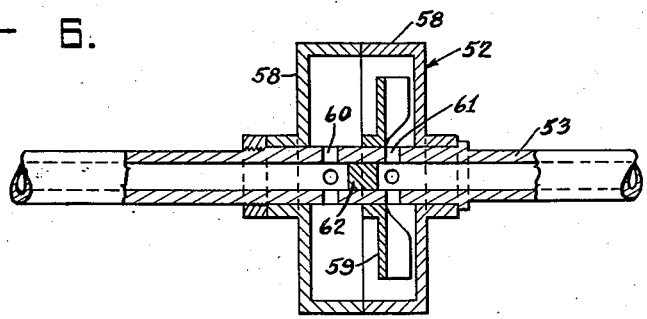
Figure 6 is a fragmentary sectional view of a water cooled drum means shown in Figures 2 and 5.
Figure 7:
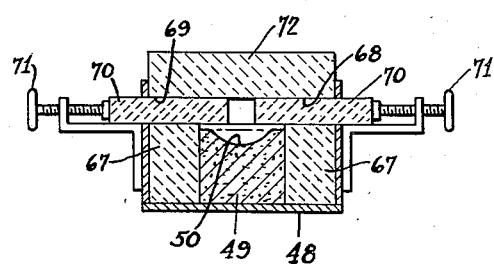
Figure 7 is a vertical section taken along the line 7—7 of Figure 2.
Figure 8:
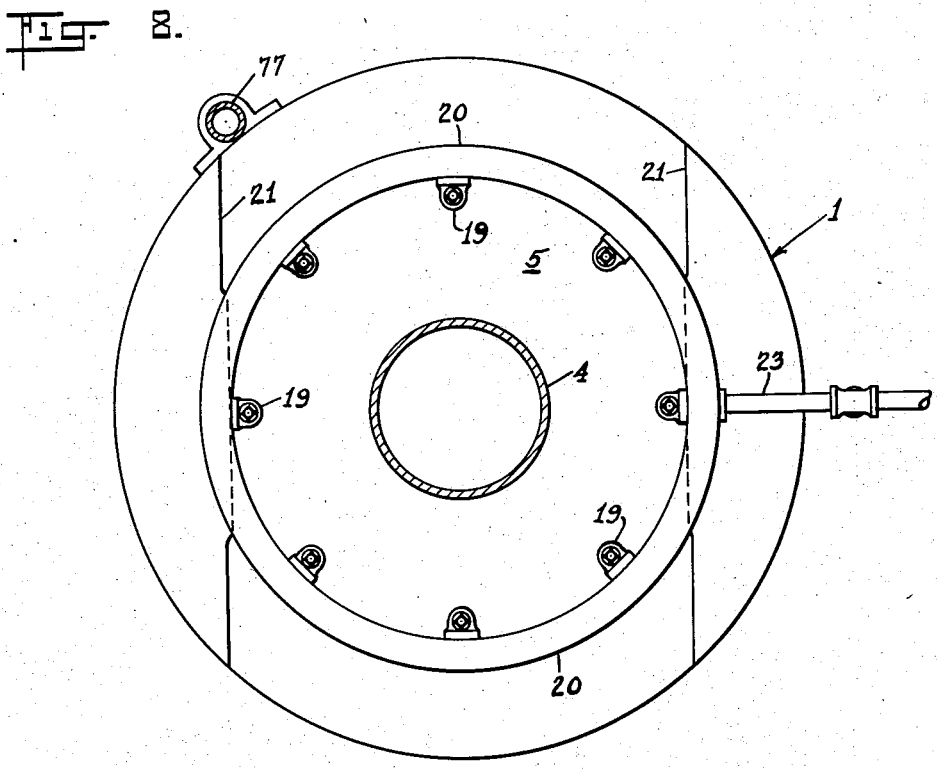
Figure 8 is a horizontal section taken along the line 8—8 of Figure 2.
Figure 9:
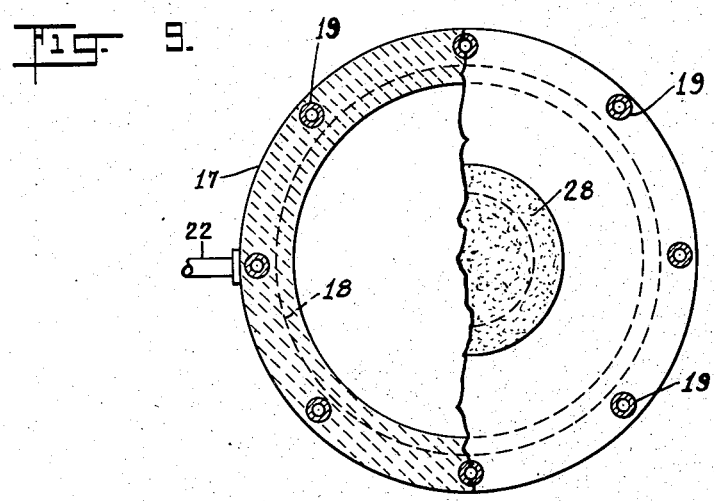
Figure 9 is a horizontal section taken along the line 9—9 of Figure 2.

Figures 13 and 14 are vertical sections taken along the lines 13—13 and 14—14 respectively of Figure 11.

My invention contemplates the provision of a refractory lined melting furnace which is adapted to feed the raw mineral materials downwardly in such a manner that the materials themselves will shield and insulate the wall of the furnace from the intense heat of its incandescent products of combustion and from the destructive effects of the heretofore mentioned alternate exposure to the lava and the heated products of combustion. The combustion chamber of the furnace is preferably provided, at its base, with an inner lave pool portion which communicates with an outer laval pool portion. This outer lava pool portion is provided with a rapidly rotatable member adapted to contact the lava in the outer pool portion and fling particles of lava above the pool into a blast of heated products of combustion which is directed into an adjacent blow chamber at a velocity sufficient to stream line the molten particles into fibers. The blast is provided by closing the upper portion of the furnace and by using any suitable fuel and air input means which is adapted to inject fuel and air into the combustion chamber at a preferably regulatable pressure greater than atmospheric pressure.

Referring now more particularly, there is illustrated at numeral 1, a furnace, including among other elements, a metal raw material feed chute means 2, the open lower end portion of which is fixedly secured in an air-tight manner to the upper portion 3 of a feed shaft 4, whose open lower portion is supported and secured in a similare manner to a metal casing 5 which encloses a refractory and preferably conical roof portion 6, a refractory and preferably cylindrical wall portion 7, and preferably clay bed portion 8 of the furnace.

The chute means 2 is provided with a preferably hingedly mounted door 9 which is provided with any suitable means (not shown) whereby the door may be fastened in any air-tight manner. This chute means is provided at its lower end portion with a bell 10 which is connected by a rod 11 to any suitable means whereby the bell 10 may be counterweighted such as, for instance, a pulley 12, a cable 13 and a counterweight 14.

The shaft 4 is operatively connected to any suitable stack 15 which is provided with a damper means 16 whereby the upward passage of smoke and other products of combustion through the stack 15 may be controlled or entirely prevented.

The roof portion 6 and the wall portion 7 of the furnace may be made of any suitable material such as, for instance, fire brick.

Within the central portion of the furnace I have provided a preferably monolithic refractory dome member 17, the lower portion of which rests upon a lower hollow steel water-cooled ring 18. This ring is suspended from a plurality of preferably steel water outlet pipes 19 which are operatively secured to an upper hollow ring 20 which rests upon brackets 21 welded, or otherwise secured to the upper portion of the casing 5. The lower ring 18 is provided with a water inlet conduit 22 and the upper ring 20 is provided with a water outlet conduit 23. These conduits 22 and 23 are preferably connected to any suitable water system. The pipes 19 pass through openings 24 in the lower portion of the dome 17 and openings 25 in the roof portion 6 of the furnace.

It will be observed that the outside surface 26 of the ring 18 is flush with the lower portion of the outside wall 27 of the refractory dome. This construction performs the important function of preventing the lower edge of the dome from being worn away by the abrasion due to the descending raw materials. The upper portion of the dome, if desired, may be recessed substantially as shown and filled with a mound 28 of shock-absorbing material such as, for instance, clay, for the purpose of preventing any possibility of injury to the dome when the raw material is first dropped during the operation of filling the furnace with raw material. After the furnace has once been filled the added raw materials serve as an arch which protects the dome from impact.

The base of the furnace preferably consists of the clay bed portion 8, and the base portion 29 of the casing 5. The base portion 29 may be stiffened and supported by angle bars 30 which may be welded or otherwise secured to the outer portion of the casing. In the center of the clay bed portion 8 and the base portion 29 I have operatively secured a preferably water-cooled combination fuel inlet and lava and products of combustion outlet member 31 which is operatively connected to a water input conduit 32 and a water outlet conduit 33 which may be respectively connected to the water inlet 22 of the ring 18 and water outlet 23 of the ring 20. This member 31 may be constructed in any suitable manner to serve the purposes intended, but as illustrated, it consists of a somewhat hollow and rectangularly formed casing 34 which is provided with a vertical duct 35 through which the lava and products of combustion pass, and a vertical duct 36 through which the co-mingled fuel and air pass into the combustion zone 37, beneath the dome member 17. The casing 34 is also provided with a water inlet coupling 38 and a water outlet coupling 39 which are adapted to be threadedly connected to the conduits 32 and 33 respectively.

The upper part of the casing is provided with a groove or depressed portion 40 which is adapted to permit the lava to flow into the duct 35 without overflowing the entire upper surface of the member 31. This arrangement retards the cooling of the lava because it enables the lava to pour in a single stream. The cooling of the lava is further retarded by the formation of a chilled lava covering on the casing 34 over which the lava stream pours. In order to prevent the formation of a steam pocket I have provided a vertically extending tube or duct 41 within the casing 34, the top portion 42 of which does not quite extend to the top of the casing 34, and the lower portion of which communicates with the outlet coupling 39 and the outlet pipe 33.

Beneath the fuel inlet and lava outlet member 31 I have fixedly secured an outer pool member 43 which is provided with a rigid metal sheath 44. This sheath 44 is preferably welded to the brackets 30 and encloses the base and walls of the outer pool member 43 which includes a vertical hollow section 45 and a hollow horizontally extending pool and heated gas passageway section 46 communicating with section 45. The sections 45 and 46 are preferably rectangular in cross section and are walled with any suitable refractory material such as, for instance, elongated fire brick or block 47.

On the upper side of the base 48 of the sheath 44 I have provided a pool bed 49 preferably formed of clay, and provided with an elongated pool basin 50. The inner portion 51 of this basin may be relatively deep and extends beneath the lava duct 35 of the member 31 to receive the stream of lava which pours from that duct.

A drum means 52 is positioned immediately above the outer shallow portion of the pool basin 50. The drum means 52 may be made of any suitable construction, but, as depicted, it includes a hollow shaft 53 which passes through suitable openings 54 and 55 in the sheathed wall of the passageway 46 of the outer pool member 43. This shaft 53 is operatively connected to any suitable stationary water inlet and water outlet means 56 and 57 which in turn are preferably connected to the conduits 32 and 33 respectively. A split drum 58 having within it an impeller 59 is fixedly secured to the hollow shaft 53. Suitably positioned openings 60 and 61 and a plug 62 are provided in the shaft 53 for the purpose of permitting the water in the shaft to be drawn by centrifugal force through the impeller 59 and out of the drum 58. The shaft 53 is mounted on any suitable bearings 63 and is adapted to be rapidly rotated by, for instance, a pulley 64. The circumferential surface of the drum is preferably provided with numerous annular V-shaped grooves 66 which provide additional lava contact surface and appreciably aid in dividing the lava hurled off the surface of the drum into numerous tiny streams or filaments which form fibers substantially without "shot".

The sheathed side wall portions 67 are preferably provided with opposed openings 68 and 69 immediately above the pool bed 49 for the purpose of receiving movable elongated blocks 70. These blocks may be moved inwardly and outwardly by any suitable means 71 and are provided for the purpose of controlling the rate of flow of the heated products of combustion past the drum means 52. When the blocks 70 are pushed together little or none of the products of combustion pass the drum means, but when the end portions of these blocks are flush with the inside of the surface of the wall portion 67 the hot gaseous flow is, of course, at its maximum. The wall portion 67 of the horizontal pool and passageway section 46 is covered with a refractory block 72 and a refractory housing 73 having removable slab 74 serving as its roof portion. The housing 73, it will be noted, encloses the upper portion of the drum 53 in such a manner as to return to the lava pool immediately beneath the drum any particles which are not hurled by it through the open end portion 75 of the passageway 46.

A blast nozzle means 76 is operatively connected to the stack 15 by a conduit 77 which is provided with a damper means 78 for the purpose of providing a comparatively cool blast of the products of combustion which is directed in such a direction as to converge upon the blast of molten particles issuing through the open end portion 75 of the outer pool member 43. This nozzle may, if desired, be operatively connected to any suitable steam or compressed air or gas outlet means 79 which is provided with a valve member 80 and is operatively connected to a suitable supply system (not shown). It will be observed the exhaust end portion 81 of the nozzle is located slightly beneath and to the rear of the bevelled end portion 82 of the outer pool member 43. This arrangement enables the nozzle means 76 to provide a shredding blast should the lava, for any reason, overflow its bed and pour out through the open end portion 75. The nozzle means is also used for other purposes hereinafter described.

From the foregoing description of the various parts of the furnace of my invention, its operation and the steps of my process of manufacturing mineral fibers may be thoroughly understood.

Through the open door 9 of the chute 2 broken or granular raw materials are fed into the chute until it is filled preferably up to the lower portion of the door opening. The bell 10 is then lowered, thereby dropping the raw materials through the stack 4 below which they are guided downwardly between the dome member 17 and the refractory roof and wall portions of the furnace and become deposited in a piled mass 83, the outer portion of which is stacked against the inner surface of the refractory wall 7, and the inner portion 84 of which is inclined downwardly and inwardly toward a preferably annular inner pool basin 85 formed in the clay bed 8 around the lava member 31. This operation of filling the chute and dropping the raw material may be repeated until the material reaches the lower end 86 of the shaft 4.

When the furnace is to be fired the door 9 is sealed in an airtight manner by any suitable means (not shown), and the damper 16 of the stack 15 is set in its open position and the damper 78 is set in its closed position. An ignition charge of fuel is then preferably passed upwardly through an opening 87 in the base 29 of the casing 5 of the furnace and through an adjacent opening (not shown) which is provided in the clay bed portion 8. This ignition charge may consist of any suitable material, such as a few sticks of wood and a small amount of oiled waste material. After the ignition charge has been lighted the opening in the clay bed may be stopped up with a ball of wet clay (not shown) and the opening 87 in the lower pool portion casing 29 is closed by any suitable means such as a small hinged door 88. A blast of co-mingled fuel and air is provided by any suitable fuel and air input means (not shown). This fuel means may be of any known type adapted to inject a blast of fuel and air into the furnace at a pressure greater than at atmospheric pressure. This fuel blast is admitted into the furnace through any suitable means such as the fuel and air conduit 89 which is operatively connected to the duct 36 of the member 31. As the fuel charge enters the furnace it is, of course, ignited by the blazing ignition charge.

The heat generated by the incandescent blast causes the inclined inner portion of piled mass 84 of raw materials to melt rapidly and run down into the inner pool portion 85 in the clay bed 8, and form an inner pool of lava which overflows through the depressed portion 40 of the lava output member 31. When the inner portion of the piled mass 84 first begins to melt the lava tends to descend vertically but is chilled by the cold interior of the piled mass in such a manner as to provide a frozen mineral shield 83' which protects the lower portion of the refractory wall 7 from the superheated products of combustion but does not prevent these products of combustion from passing upwardly through the raw materials around the outside of the dome 17 and through the stack 15 when the damper 16 is in its opened position.

With the damper means 16 and 78 closed, all of the heated and greatly expanded gaseous products of combustion are forced downwardly to form a superheated blast which passes through the conduit 35 of the member 31, through the hollow vertical section 45, over the lava in the pool basin 50, around the drum 58, and out of the furnace at 75.

When the outer pool basin 50 is substantially filled the upper surface of the lava in the clay bed 49 is in contact with the lower portion of the drum 58. The rapid rotation of the drum lifts and hurls the molten particles above the surface of the pool at a sufficiently high velocity, to streamline the particles into molten fibers. It will, of course, be understood should the velocity of the drum be reduced to a speed insufficient to streamline the lava into fibers that the drum will require a stream or blast to assist it in giving the molten particles sufficient force to become streamlined into fibers.

The blast of the heated products of combustion passing out of the furnace at 75 materially aids the drum in hurling the molten particles 90 against the relatively still gases in an adjacent blow chamber 91. This blast also prevents the molten particles from cooling rapidly while they are passing into the blow chamber. In addition, the blast maintains an elevated temperature in the blow chamber for the purpose of permitting the fibers to become slowly annealed during the time they are suspended in the gaseous atmosphere of the blow chamber and are being carried out of it in the form of an elongated mat on the movable base or conveyor (not shown) of the blow chamber.

Under certain conditions such as, for instance, when the furnace is melting the raw materials at its maximum rate both the temperature and the volume of the blast passing out of the furnace at 75 may be excessive. Under these conditions the inner portions of the blocks 70 should be moved inwardly to reduce this blast, and the damper means 78 of the conduit 77 adjusted so as to permit the products of combustion which have been substantially cooled by passing through the raw material in the upper part of the furnace, to flow through the nozzle means 76 and intermingle with the blast passing out at 75. The temperature of this combined blast will, of course, be less than that of the blast passing out of 75.

Should the temperature of the combined blast still be excessive or the velocity of the blast be insufficient for the purposes intended, the valve 80 of the steam outlet or compressed air nozzle means 79 may be opened as much as is necessary to correct these conditions.

It will be noted that the steam or compressed air may be, and preferably is, intermingled with, and heated by, the products of combustion passing through the nozzle means 76 before it comes into contact with the molten particles 90. The temperature of the blast passing through the nozzle means 76 should never be sufficiently low to permit the molten particles 90 to cool rapidly, as slow annealing is always essential to the production of the best grade of fibers.

At times it, of course, becomes necessary for the operator to enter the furnace. In order to gain admittance an open portion 92 is provided in the refractory wall portion 7. This opening is normally closed with a plurality of brick 93 which may be bound together with mud mortar and may be reinforced with a metal plate 94 which is bolted to the casing 5.

A dump door means 95 is preferably provided in the base of the furnace through which the contents of the furnace may be dumped when necessary. The dump door means may be held in its closed position by any suitable means such as, for instance, a brace rod (not shown). The furnace is supported above its supporting floor at a convenient height in any suitable manner such as by a plurality of leg members 96.

The blow chamber 91 may be of conventional construction, but it will be usually found advantageous to line the inside surface of its walls and roof with any suitable heat insulating material 97 for the purpose of preventing the gases in the blow chamber from losing their heat too rapidly. It will be found unnecessary to insulate the conveyor as the fibers falling upon the conveyor provide sufficient insulation.

From the above description of the details of the furnace, it is apparent that the damper 16 of the stack 15 may be so adjusted by the operator that a sufficient amount of the heated gases may pass through the raw materials to heat them without passing enough gases to blow small granular particles out of the furnace.

It is also apparent that the walls of the furnace are shielded from contact with the hot molten lava by the mineral materials themselves, and that for this reason the refractory wall may be safely used, and the heat losses of the furnace may be kept far lower than is possible with water-cooled metal walls.

It is equally obvious that the products of combustion may be advantageously used to hurl the fibers into the blow chamber and to insure temperature conditions in the blow chamber which will be conducive to the proper annealing of the fibers.

Another advantageous feature is that the temperature in the blow chamber may, if desired, be maintained high enough to permit the fibers to fall upon the conveyor in the blow chamber in a sufficiently viscous condition to cause them to adhere to each other without the use of any binding material.

It is also apparent that the use of two pools in series with each other practically insures, if the furnace be properly tended, that the heavier and undesirable metals, which are found to a certain extent in practically all wool-rocks and mineral slags, will settle to the bottom of the pools, where these metals will not be carried out with the lava in the blast. These metals should, of course, be drained from the bottom of the pools in a manner well known to the art, through such openings as the opening 87 and the opening 98 provided in the casings and sheath below these pools.

It will finally be noted that I have provided means whereby a film of lava may be separated from its body, divided into filamentary particles, and annealed under conditions most conducive to the proper annealing of the particles, to the end that ideal fibers may be formed.

Various modifications, may, of course, be made in the details of my furnace and in the steps of my process without departing from the true spirit of my invention. I, therefore, wish to be limited only by the scope of the following claims.

I claim:

1. The method of forming fibers of molten mineral materials comprising forming and maintaining a molten mass of said materials and rotating the periphery of a rigid curved surface in contact with the upper portion of said mass at a velocity sufficiently high to hurl portions of the material away from said mass in the form of fibers.

2. The method of forming fibers of molten mineral materials comprising forming and maintaining a molten mass of said materials and rotating a rigid body of substantially circular cross-section with the periphery thereof in contact with the upper portion of said mass at a velocity sufficiently high to hurl portions of the material away from said mass in the form of fibers.

3. The method of forming fibers of molten mineral materials comprising forming and maintaining a molten mass of said materials and rotating the periphery of a chilled rigid curved surface in contact with the upper portion of said mass at a velocity sufficiently high to hurl portions of the molten material away from said mass in the form of fibers.

4. The method of forming fibers of molten mineral materials comprising forming and maintaining a molten mass of said materials and rotating a chilled rigid body of substantially circular cross-section with the periphery thereof in contact with the upper portion of said mass at a velocity sufficiently high to hurl portions of the material away from said mass in the form of fibers.

5. The method of forming fibers from molten materials comprising forming and maintaining a mass of said molten materials in highly heated condition and rotating a rigid body having a grooved curved periphery against the upper portion of said mass to hurl elongated streams of said molten materials away from said mass at a velocity sufficient to streamline said materials into mineral fibers.

6. The method of forming fibers of molten mineral materials comprising forming and maintaining a mass of molten mineral materials, passing a fluid blast over the upper surface of said mass rotating a rigid body having a substantially curved periphery in said blast and against the upper portion of said mass to hurl portions of said material away from said mass and into said blast, and thereafter projecting said materials into a relatively stationary atmosphere at a velocity sufficiently high to streamline the molten material into mineral fibers.

7. The method of forming fibers of molten mineral materials comprising forming and maintaining a mass of molten mineral materials, passing a hot fluid blast over the upper surface of said mass rotating a rigid body having a substantially curved periphery in said blast and against the upper portion of said mass to hurl portions of said material away from said mass and into said blast, and thereafter projecting said materials into a relatively stationary atmosphere at a velocity sufficiently high to streamline the molten material into mineral fibers.

8. The method of forming fibers of molten mineral materials comprising forming a mass of molten mineral materials, passing a fluid blast over the upper surface of said mass, rotating a rigid body having a curved periphery in said blast and against the upper portion of said mass to hurl portions of said material away from said mass and into said blast, and thereafter projecting said hurled materials in said blast into a second blast to accelerate the velocity of said portions and to streamline said portions into mineral wool fibers and discharge said fibers into a relatively stationary atmosphere.

DANIEL C. DRILL.